United States Patent [19]

Ball

[11] Patent Number: 5,224,728
[45] Date of Patent: Jul. 6, 1993

[54] TRAILER HANGER

[76] Inventor: Carrol Ball, 1410 Regency Pkwy., Dixon, Calif. 95620

[21] Appl. No.: 855,572

[22] Filed: Mar. 23, 1992

[51] Int. Cl.⁵ ............................................. B60D 13/00
[52] U.S. Cl. ................................ 280/476.1; 280/402; 280/656
[58] Field of Search ............... 280/401, 402, 476.1, 280/490.1, 638, 656, 789

[56] References Cited

U.S. PATENT DOCUMENTS

| | | | |
|---|---|---|---|
| 2,254,437 | 9/1941 | Marney | 280/401 |
| 2,438,415 | 3/1948 | Riboud | 280/476.1 |
| 3,627,154 | 12/1971 | Troap | 280/402 X |
| 3,877,714 | 4/1975 | Black | 280/656 X |
| 4,393,943 | 7/1983 | Andersson | 280/656 X |

Primary Examiner—Joseph F. Peters, Jr.
Assistant Examiner—Christopher P. Ellis
Attorney, Agent, or Firm—William S. Bernheim

[57] ABSTRACT

An assembly for hanging a vehicle tow trailer vertically in a stowed position on a vehicle. The assembly includes a hitch donkey which moves upward and downward along a vertical post to carry the vehicle tow trailer to its stowed or deployed position. The most common application of this assembly would be to the rear end of a motor home where towing trailers are often attached during travel.

4 Claims, 5 Drawing Sheets

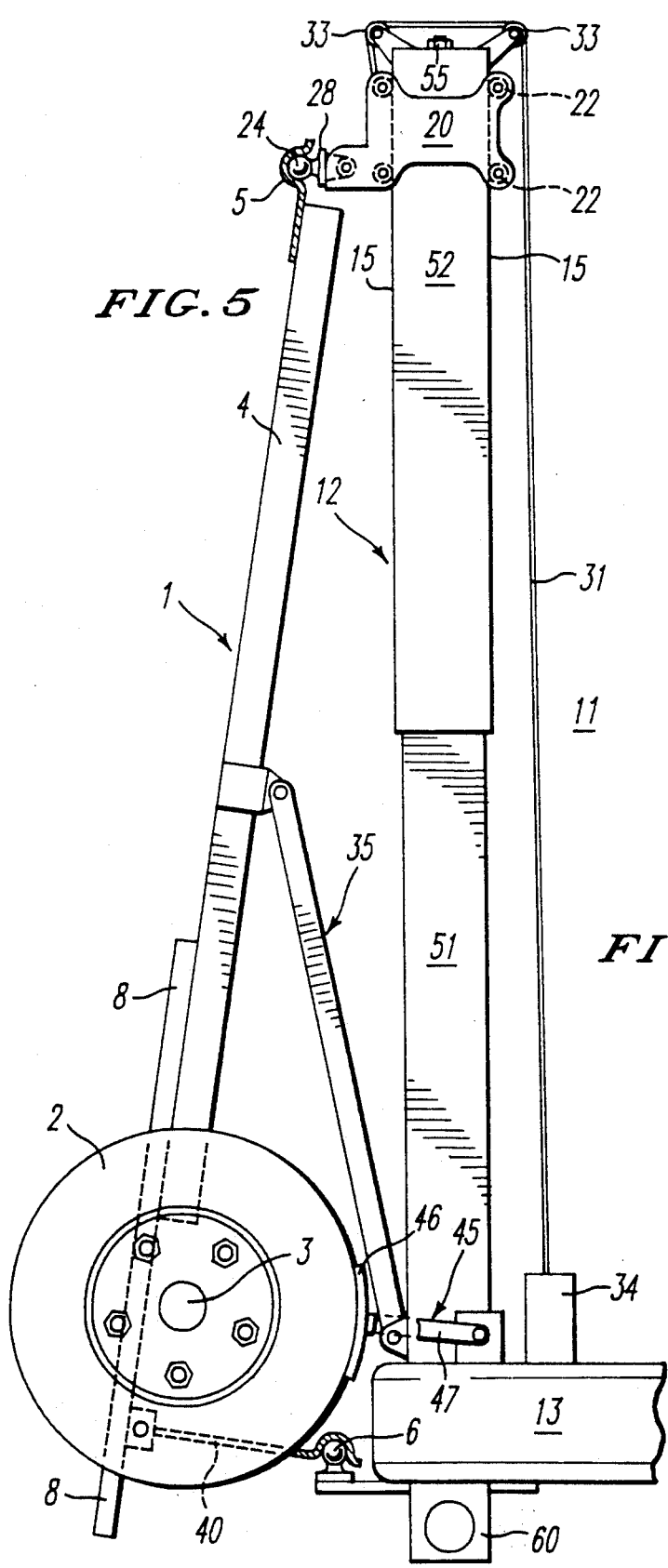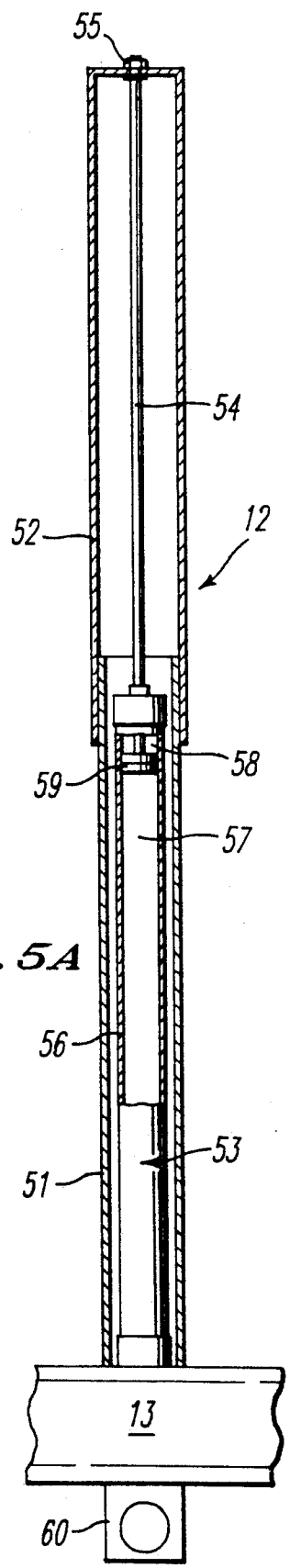
FIG. 5
FIG. 5A

TRAILER HANGER

BACKGROUND OF THE INVENTION

1. Field of the Invention

The present invention relates to a hanger assembly for suspending for purposes of storage of a vehicular tow trailer in a vertical position on the rear of a motor home.

2. Description of the Prior Art

Motorhomes are popular with travelers. The large size of the typical motorhome allows for more comfort but is a disadvantage for short trips. For short trips, motorhomes are unwieldly and display poor fuel economy. For this reason, motorhome travelers frequently tow a car behind their motorhome for use in making short trips at destinations.

The tow can be accomplished in several ways. At first blush, a tow bar attached to the front of the towed vehicle looks the easiest. This is not a complete answer. The transmission in many cars needs lubrication and the transmission will overheat and be damaged if such a car is towed for an extended distance. Although transmission modification may be an option, it is expensive and is required on each such car to be towed. Further, attaching and removing a tow bar from the front of a car may also be too physically taxing for a particular traveler. The traveler may also want to tow different cars from time to time which entails moving the tow bar and adjusting the tow bar to fit a particular car.

An alternative is for the motorhome traveler to make use of a vehicle tow trailer ("VTT"). A VTT is a small trailer on to which the drive wheels of a vehicle to be towed are driven. By this means, the transmission of the towed vehicle is not heated during towing. Major advantages include avoiding modification of transmissions and avoiding the physical effort of attaching a tow bar. A major drawback with a VTT is what to do with the trailer at a destination or at home when the towed vehicle is off the trailer. Space is usually a problem. Many campgrounds will not allow a VTT onto the grounds or will charge extra fees.

STATEMENT OF THE OBJECTS

Accordingly, it is an objective of the present invention to Provide a hanger assembly for lifting and hanging a vehicular tow trailer vertically from the back bumper of a motorhome to reduce the area needed to store the VTT.

Other objectives, advantages and novel features of the invention will become apparent to those skilled in the art upon examination of the invention and the accompanying drawings.

SUMMARY OF THE INVENTION

Brief Description of the Drawings

Further objectives and advantages of the invention will be apparent from the following detailed description, taken in conjunction with the accompanying drawings illustrating a preferred embodiment of the invention. The drawings are:

FIG. 5 is a side view not to scale of a hanger assembly in accordance with the invention with a vehicle tow trailer hanging from the assembly.

FIG. 5A is a side view not to scale of the telescoping post and hydraulic ram of the hanger assembly of FIG. 5.

Detailed Description of a Preferred Embodiment

Figure 1:
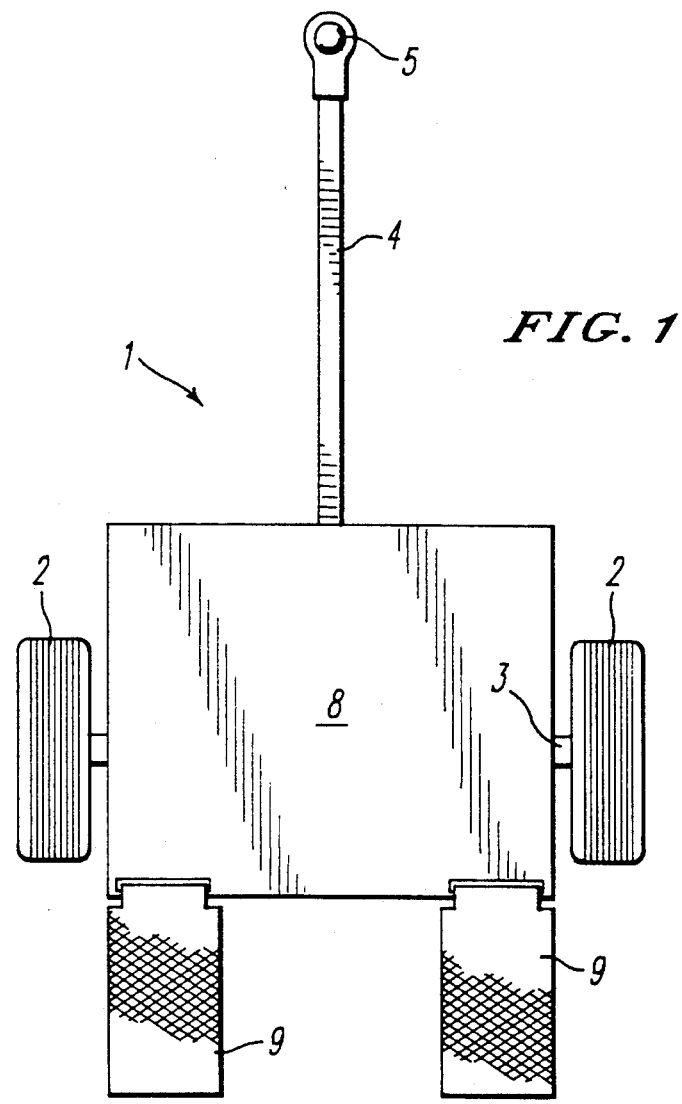
FIG. 1 is a top view not to scale of a vehicle tow trailer.
Figure 2:
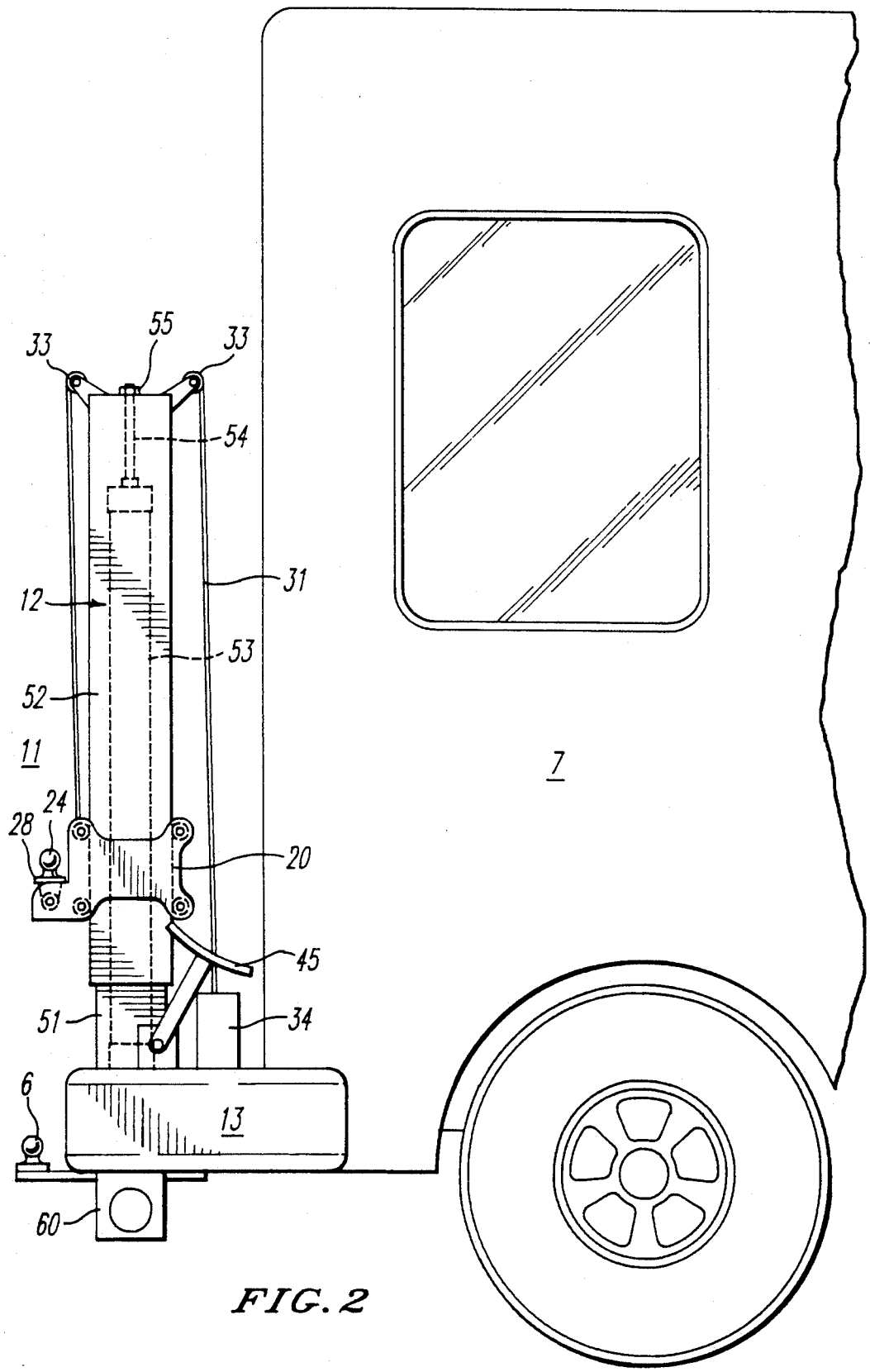
FIG. 2 is a side view not to scale of a hanger assembly in accordance with the invention mounted on a motorhome.
Figure 3:
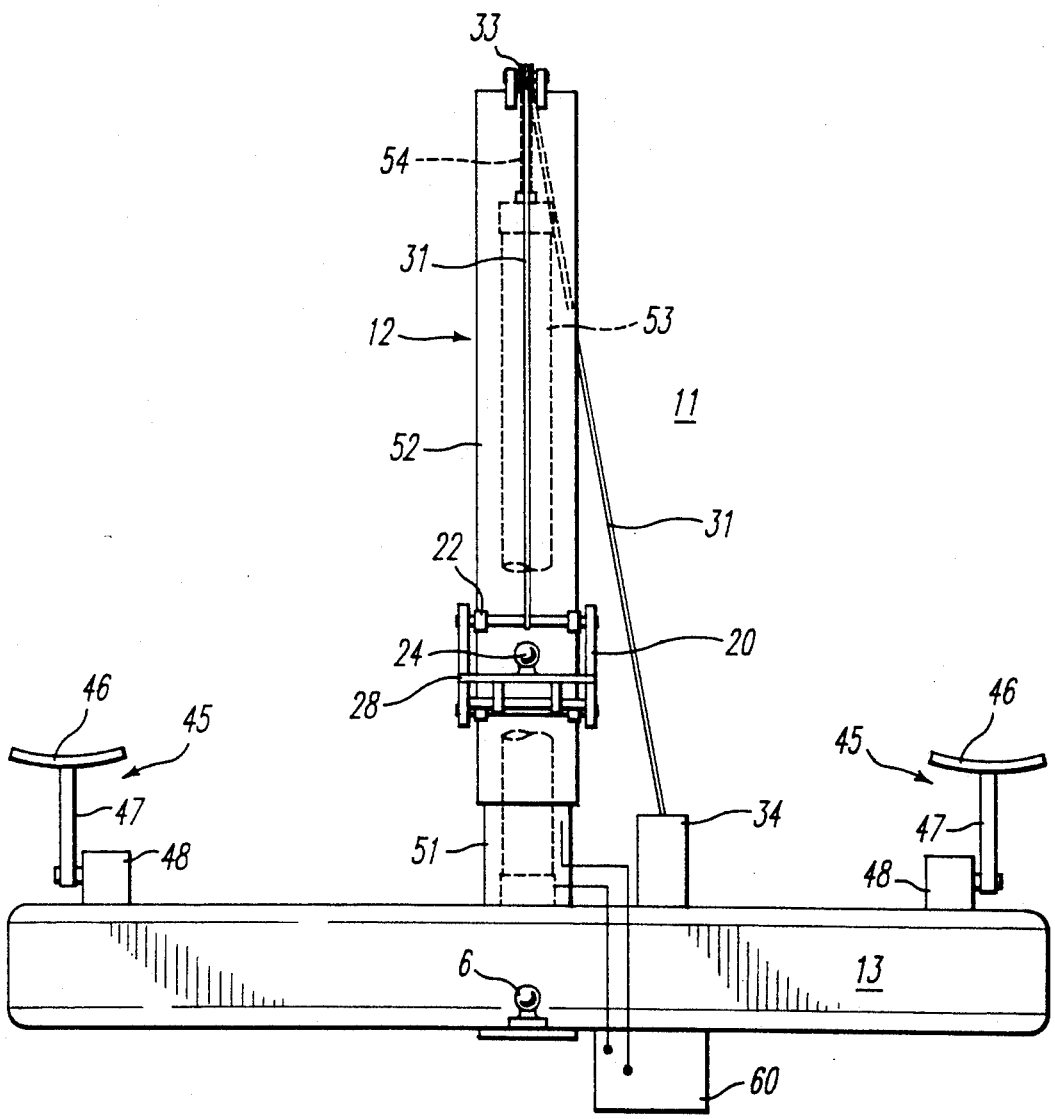
FIG. 3 is an end view not to scale of a hanger assembly in accordance with the invention mounted on a motorhome.

A vehicle tow trailer (VTT) 1 is a type of trailer for use in towing vehicles. As shown in FIG. 1, the typical VTT 1 has a set of tires 2 mounted on an axle 3, a single axle is normally sufficient. Attached to the axle and projecting forward is a tongue 4. A trailer coupler 5, normally a socket, is mounted at the end of the tongue 4 distal from the axle 3. The trailer coupler 5 is used to secured the trailer to a mating coupler 6, as shown in FIG. 2, usually a ball, mounted on a motorhome or other vehicle 7 which is to do the towing. A bed 8 is mounted onto the tongue 4 and axle 3. The VTT 1 is equipped with ramps 9 mounted to the bed 8 so that the drive wheels of a vehicle to be towed can be driven up onto the bed 8. With the drive wheels of the towed vehicle on the bed 8 the towing is accomplished without concern for the transmission of the towed vehicle. Typically the ramps 9 are made of the same material as the bed 8. Once the drive wheels are on the bed 8, the ramps 9 are removed or folded up out of the way.

A hanger assembly 11 in accordance with the invention is shown in FIG. 2. In more detail, a telescoping vertical metal post 12 is mounted at the rear of a vehicle 7 which is to do the towing by attachment to the rear bumper 13 or to the frame of the vehicle 7 by bolting or welding.

The telescoping post 12 includes an inside post 51 and an outside post 52 which slides over the exterior of the inner post 51. As shown in FIG. 5 and FIG. 5A, mounted inside the inside post 51 is a hydraulic ram 53 which drives a rod 54 which controls the height of the outside post 52. The rod 54 is attached to the top of outside post 52 by threading the top of the rod 54, passing the threads through a hole in the top of the outside post 52 and screwing a nut 55 onto the threads.

The hydraulic ram 53 includes an cylindrical chamber 56 which is divided into two spaces 57 and 58 each in fluid communication with a hydraulic pump 60. The spaces are on either side of the enlarged bottom 59 of the ram 54 which is enlarged at that point by use of a gasket or the like to divide the cylindrical chamber 56 into the two spaces. To raise the outside post 52, the pump 60 forces fluid into the lower space 57 to raise the rod 54 to in turn raise the outside post 52. To lower the outside post 52, the pump 60 is switched to force fluid into the upper space 58 while allowing fluid to drain off the lower space 57.

The exterior surface of the outside post 52 is formed to provide tracks 15 which extend continuously along the outside post 52 preferably adjacent to the corners. If the outside post 52 is a rectangular tube, the normal surfaces will normally be suitable to serve as tracks 15. Preferably, the track surfaces are chromed to provide a smooth, corrosion resistant surface.

The post 12, when extended, extends to about 8 feet 2 inches vertically above the level of the bumper 13. The post 12, when telescoped, contracts to about 4 feet 6 inches. The post 12 is extended to hang the VTT in the air and contracted to lower the VTT to the ground and also when not in use to save room and be less obstructive to view.

Alternatively, the post 12 can be rigid and extend about 8 feet 2 inches. In this embodiment the tracks 15 extend the length of the post 12. A hydraulic ram is unnecessary and the lifting preferably accomplished with a winch and pulleys.

Figure 4:
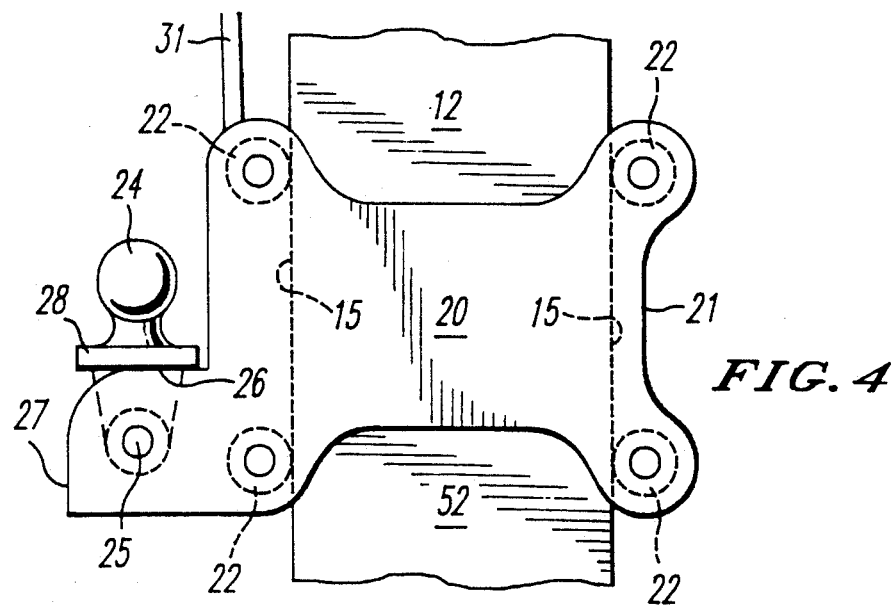
FIG. 4 is a side view not to scale of a hitch donkey in accordance with the invention.

As shown in FIG. 4, a hitch donkey 20 is mounted to travel along the tracks 15. The hitch donkey 20 includes a frame 21 which encompasses the post 12 and includes 4 pairs of rollers 22 to move along tracks 15 on opposing sides of the post 12. A lifting coupler 24, normally a ball, identical to the mating coupler 6 mounted on the towing vehicle, is rotatably mounted to the frame 21 on a bolt 25 so that the ball 24 can rotate through at least 90° of rotation. The limitation of rotation is provided by the frame 21 which includes horizontal surfaces 26 and vertical surfaces 27 acting in concert with a lip 28 which is a part of coupler 24. When not in use the ball 24 is upright. In use the ball 24 rotates 90° degrees as the tongue 4 is drawn upward as the donkey 20 moves up the post 12 and the ball 24 faces away from the towing vehicle. An attaching means 31, such as a wire or chain, attaches the donkey hitch 20 by way of pulleys means 33 at the top of the outside post 52 to the frame 13. In the telescoping embodiment the length of the chain remains constant and as the outside post 52 rises the donkey hitch 20 is moved toward the top of the outside post 52.

In the rigid post 12 embodiment the attaching means 31 is attached to a power means 34 by way of a pulley means 33. The Pulley means 33 as best seen in FIG. 5 can be provided by two pulleys 33 mounted at the top of the post 12 at the front and at the back. Alternatively, to provide more mechanical advantage or to slow the speed at which the donkey 20 moves along the post 12, a block and tackle is mounted at the top of the post 12.

With the rigid post 12, the power means 34, such as an electric winch or hand winch, is mounted to the rear of the towing vehicle and a metal wire 31 is strung through the pulleys 33 and attached to the hitch donkey 20. In its lowered position the hitch donkey 2 is at rest. The power means 34 is used to move the hitch donkey 20 up and down the post 12.

Figure 6:
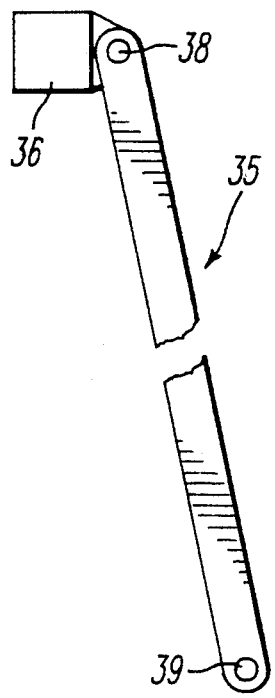
FIG. 6 is a side view not to scale of a kicker in accordance with the invention.
Figure 7:
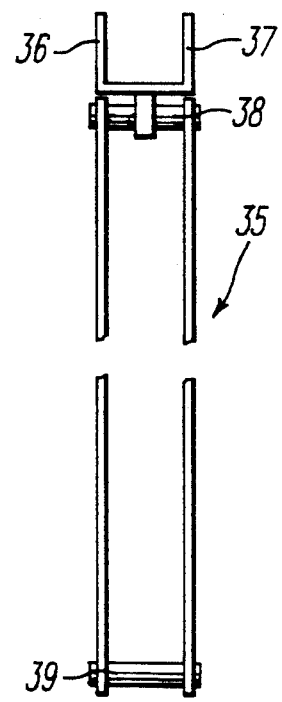
FIG. 7 is a top view not to scale of a kicker in accordance with the invention.
Figure 8:
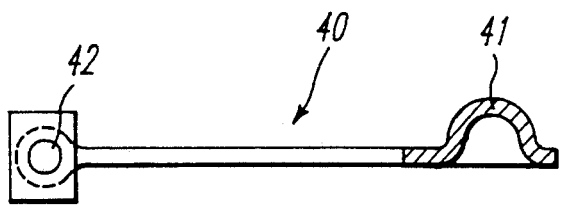
FIG. 8 is a side view not to scale of a lock means in accordance with the invention.
Figure 9:
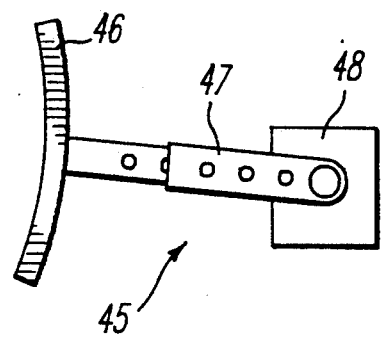
FIG. 9 is a top view not to scale of a tire stop in accordance with the invention.

A kicker means 35, as best seen in FIGS. 6 and 7, is a support and control means. The kicker means 35, as shown in FIG. 5, is detached from the VTT 1 and towing vehicle 7 when the VTT 1 is not being hung from the assembly 11. The kicker means 35 is attached to the lower portion of the post 12 and attached to the VTT 1 adjacent the axle 3 forward of the bed 8 when the VTT 1 is being lifted and is detached as the VTT 1 is lowered. The kicker means 35 becomes load bearing as the angle between the post 12 and VTT 1 is reduced and shares the weight of the VTT 1 with the donkey 20 as the VTT 1 leaves the ground.

The kicker means 35 is an elongated metal structure having two arms 36 and 37 and cross members 38 and 39. As the VTT 1 is drawn upward on the post 12 the axle 3 of the VTT 1 is drawn toward the back of the towing vehicle. When drawn about ¾ of the way upward the kicker means 35 is detachably and rotatably mounted to the VTT 1 adjacent the axle 3 and at the distal end detachably and rotatably mounted adjacent the bottom of the post 12. The kicker 35 controls the arc in all directions of the bottom of the VTT 1 as the lifting is continued and as the VTT 1 continues upward a portion of the weight of the VTT 1 is shifted to the kicker 35.

A lock means 40 is also attached to the lower end of the post 12 and has a means for detachably attaching to the VTT 1 when the VTT 1 is in the hanging or stored position. In more detail, at one end the lock means 40 includes a hook or socket 41 to surround the neck of or slip over the mating coupler 6. At the other end 42, the lock means 40 is rotatably mounted to the trailer preferably to the axle 3 so that the lock means 40 extends parallel with the bed 8 of the VTT when not in use and swings down to slip over the mating coupler 6 when used to lock the VTT 1 to the hanger assembly 11. The lock means 40 and kicker means 35 act in concert to prevent the VTT 1 from moving lower when in the hung position. To move downward the kicker means 35 forces the axle 3 outward from the post 12 but the lock means 40 prevents the axle 3 from moving outward.

It is intended that the vehicle tow VTT 1 be hung on the towing vehicle 7 only for storage purposes, such as during periods when the towing vehicle 7 is not being used or at campgrounds when the towing vehicle 7 is being used for living and not transportation. When the VTT 1 has been used for towing and the towed vehicle backed off the VTT 1, the procedure for hanging the VTT 1 is first to loosen the trailer coupler 5 and disconnect any safety connectors. The coupler 5 is then lifted off the mating coupler 6 and set down and tightened on the lifting coupler 24 which is part of the hitch donkey 20.

In the telescoping post 12 embodiment which is the preferred version, the hydraulic pump 60 is engaged to send fluid to lower space 58 to force rod 54 upward to in turn move the outside post 52 upward and force the wire 31 to draw the hitch donkey 20 upward with the VTT attached.

Alternatively, with the rigid post 12, the winch 34 takes up any slack and begins to take up the wire 31 which goes through the pulley 33 down to the hitch donkey 20. This action of the winch 34 causes the donkey 20 to move upward and in turn the tongue 4 of the VTT 1 moves upward.

In either embodiment, as the donkey 20 moves upward, the angle of the tongue 4 to the ground changes and the lifting coupler 24 on the donkey 20 rotates so that the coupling 5 and lifting coupler 24 do not change relative position. The wheels 2 of the VTT 1 move towards the back of the towing vehicle 7. Not every VTT 1 can be lifted in this fashion. The length of the VTT 1 beyond the axle 3 and height off the ground must be such that the changing angle as the tongue 4 is lifted does not cause the rear of the VTT 1 to strike the ground and drag.

The kicker means 35 is attached as the axle 3 approaches the back of the vehicle 7. The kicker means 35 rotates as the lifting continues and controls the movement of the VTT 1 as it approaches vertical. This kicker restricts the VTT 1 from twisting or striking the back of the vehicle 7 and also forces the VTT 1 outward when the VTT 1 is lowered. In more detail as show in FIGS. 6 and 7, the kicker means 35 has two arms 36 and 37 spaced apart by cross members 38 and 39. The cross members are located inward of the ends of arms to form a U-shape to interact at one end with the post 12 by enclosing three sides of the post 12 and at the other end with the tongue 4 or axle 3.

In the hanging position the locking means 40 in combination with the kicker 35 serve as a safety means preventing the VTT 1 from dropping even if hydraulic valves fail or the winch fails or the wire 31 breaks. To move downward the kicker 35 forces the VTT 1 to move outward and the lock means 40 prevents the VTT 1 from moving outward.

As a further safety means and control means there are two wheel stays 45 rotatably attached to the bumper 13 or frame of the towing vehicle 7 distal from the vertical post 12 on either side of the bumper 13. The wheel stays 45 contact the tires 2 or alternatively the axle adjacent each wheel as the VTT comes into a hanging position. When contacted the stays 45 prevent rotation or twisting of the VTT 1 about a vertical axis along the tongue 4.

Each wheel stay 45 includes a pad 46 mounted on an arm 47 whose length can be adjusted to allow employment with different size tires. In turn the arm 47 is rotatably mounted on a base which can be attached to the bumper 13 and on which the arms 47 can be rotated so the pads can be swung out of the way when not in use.

I claim:

1. A hanger assembly for a towing vehicle by which a vehicle tow trailer, having a tongue including a coupler, an axle and a bed, can be stowed in a vertical configuration by being hung from the assembly when not in use comprising:
    (a) a vertical post mounted to and supported on the frame of the towing vehicle having a track extending along the post,
    (b) a kicker rotatably attachable at one end to cooperate with the vertical post and at the distal end having a connecting means to detachably connect to the vehicle tow trailer adjacent the axle of the trailer,
    (c) a hitch donkey mounted to travel along the track including a frame, a coupling means rotatably attached to the frame,
    (d) a power means for moving the hitch donkey along the track, and
    (e) a lock means attached to the lower end of the post to detachably attach to the trailer to act in concert with the kicker to prevent the trailer from moving lower when in the hung position.

2. The assembly of claim 1 further including wheel stays.

3. The assembly of claim 1 wherein hydraulics are incorporated as part of the power means.

4. The assembly of claim 1 wherein the vertical post includes an inside post and outside post.

* * * * *